United States Patent
Brown

(10) Patent No.: US 10,587,614 B2
(45) Date of Patent: *Mar. 10, 2020

(54) METHOD AND APPARATUS FOR FACILITATING FRICTIONLESS TWO-FACTOR AUTHENTICATION

(71) Applicant: AVERON US, INC., Henderson, NV (US)

(72) Inventor: Wendell Brown, Henderson, NV (US)

(73) Assignee: AVERON US, INC., Henderson, NV (US)

( * ) Notice: Subject to any disclaimer, the term of this patent is extended or adjusted under 35 U.S.C. 154(b) by 146 days.

This patent is subject to a terminal disclaimer.

(21) Appl. No.: 15/424,595

(22) Filed: Feb. 3, 2017

(65) Prior Publication Data
US 2019/0260737 A1 Aug. 22, 2019

Related U.S. Application Data

(60) Provisional application No. 62/290,491, filed on Feb. 3, 2016, provisional application No. 62/313,845, filed on
(Continued)

(51) Int. Cl.
*H04L 29/06* (2006.01)

(52) U.S. Cl.
CPC ...... *H04L 63/0853* (2013.01); *H04L 63/0861* (2013.01); *H04L 63/0876* (2013.01);
(Continued)

(58) Field of Classification Search
CPC . H04L 63/101; H04L 63/102; H04L 63/0876; H04L 63/083; H04L 63/0861;
(Continued)

(56) References Cited

U.S. PATENT DOCUMENTS

| 6,014,085 A | 1/2000 | Patel |
| 6,993,659 B2 | 1/2006 | Milgramm et al. |

(Continued)

FOREIGN PATENT DOCUMENTS

| EP | 3185196 | 6/2017 |
| WO | 2003/030571 | 4/2003 |
| WO | 2017/134632 A1 | 8/2017 |

OTHER PUBLICATIONS

U.S. Appl. No. 15/938,191, filed Mar. 28, 2018.*
(Continued)

*Primary Examiner* — Hosuk Song
(74) *Attorney, Agent, or Firm* — Alston & Bird LLP

(57) ABSTRACT

A method, apparatus and computer program products are provided for facilitating performing frictionless two-factor authentication. One example method includes receiving, from a first entity, an indication of a request, received at the first entity, to access an account from a device associated with a user, the indication comprising at least one instance of first device identification information of at least one device having authorization to access the account, receiving, from a second entity, second device identification information, the second device identification information determined upon the device accessing to the network address, performing a real-time comparison between the first device identification information and second device identification information, and prompting the first entity to grant the device access to the account if a match is detected between the first device identification information and second device identification information.

24 Claims, 8 Drawing Sheets

Related U.S. Application Data on Mar. 28, 2016, provisional application No. 62/325,478, filed on Apr. 21, 2016, provisional application No. 62/416,210, filed on Nov. 2, 2016.

(52) U.S. Cl.
CPC ........ *H04L 63/0884* (2013.01); *H04L 63/101* (2013.01); *H04L 2463/082* (2013.01)

(58) Field of Classification Search
CPC ............. H04L 63/0884; H04L 63/0869; H04L 2463/082; H04W 12/06; H04W 12/08
USPC .................................... 726/2–4; 713/168–170
See application file for complete search history.

(56) References Cited

U.S. PATENT DOCUMENTS

| | | | |
|---|---|---|---|
| 7,536,709 B2 | 5/2009 | Shitano | |
| 8,090,945 B2* | 1/2012 | Singhal | G06F 21/32 713/168 |
| 8,286,227 B1 | 10/2012 | Zheng | |
| 8,321,285 B1 | 11/2012 | Hurst | |
| 8,347,368 B2 | 1/2013 | Kato | |
| 8,751,801 B2* | 6/2014 | Harris | G06F 21/31 713/168 |
| 8,752,147 B2* | 6/2014 | Tamai | G06F 21/36 713/168 |
| 8,799,655 B1 | 8/2014 | Dotan et al. | |
| 9,032,498 B1 | 5/2015 | Ben Ayed | |
| 9,037,118 B2 | 5/2015 | Gaddam et al. | |
| 9,143,506 B2 | 9/2015 | Duncan | |
| 9,292,832 B2 | 3/2016 | Goel et al. | |
| 9,391,985 B2* | 7/2016 | Hefetz | H04L 63/18 |
| 9,949,130 B2 | 4/2018 | Ophir et al. | |
| 9,992,198 B2* | 6/2018 | Bao | H04L 63/0838 |
| 10,084,780 B2* | 9/2018 | Bao | H04L 63/0884 |
| 2005/0149731 A1 | 7/2005 | Leppanen et al. | |
| 2007/0056022 A1 | 3/2007 | Dvir | |
| 2007/0233615 A1 | 10/2007 | Tumminaro | |
| 2009/0187492 A1 | 7/2009 | Hammad et al. | |
| 2012/0246702 A1 | 9/2012 | Shepler et al. | |
| 2014/0136353 A1 | 5/2014 | Goldman et al. | |
| 2014/0149293 A1 | 5/2014 | Laracey | |
| 2014/0157381 A1 | 6/2014 | Disraeli | |
| 2014/0258110 A1 | 9/2014 | Davis et al. | |
| 2015/0073980 A1 | 3/2015 | Griffin et al. | |
| 2015/0120512 A1 | 4/2015 | Chen | |
| 2015/0188905 A1 | 7/2015 | Baukman et al. | |
| 2015/0254672 A1 | 9/2015 | Huesch et al. | |
| 2016/0277439 A1 | 9/2016 | Rotter et al. | |
| 2016/0328698 A1 | 11/2016 | Kumaraguruparan et al. | |
| 2017/0024818 A1 | 1/2017 | Wager et al. | |
| 2017/0171199 A1 | 6/2017 | Bao et al. | |
| 2017/0171200 A1 | 6/2017 | Bao et al. | |

OTHER PUBLICATIONS

U.S. Appl. No. 15/938,226, filed Mar. 28, 2018.*
U.S. Appl. No. 15/938,230, filed Mar. 28, 2018.*
International Search Report and Written Opinion for corresponding International Application No. PCT/IB2017/050618, dated Mar. 28, 2017.
Anonymous: Risks and Opportunities for Systems Using Blockchain and Smart Contracts, [online] [retrieved on Apr. 10, 2018], Retrieved from the Internet URL:file:///C:/Users/GS52909/AppData/Local/Temp/Blockchain-RisksandOpps-HTML.html> dated May 31, 2017.
International Search Report and Written Opinion for International Application No. PCT/US2019/021196 dated May 15, 2019.
International Search Report and Written Opinion for International Application No. PCT/US2019/024337 dated Jun. 18, 2019.
International Search Report and Written Opinion for International Application No. PCT/US2019/024480 dated May 16, 2019.
International Search Report and Written Opinion for International Application No. PCT/US2019/024487 dated May 16, 2019.
International Search Report and Written Opinion for International Application No. PCT/US2019/024527 dated May 16, 2019.
International Search Report and Written Opinion for International Application No. PCT/US2019/024566 dated Jun. 21, 2019.
International Search Report and Written Opinion for International Application No. PCT/US2019/024582 dated May 24, 2019.
International Search Report and Written Opinion for International Application No. PCT/US2019/024590 dated Jun. 4, 2019.
List of references dated Jan. 10, 2019 for U.S. Appl. No. 15/938,276.
List of references dated Nov. 29, 2018 for U.S. Appl. No. 15/424,595.
Non-Final Rejection dated Dec. 14, 2018 for U.S. Appl. No. 15/424,597.
Non-Final Rejection dated Dec. 14, 2018 for U.S. Appl. No. 15/938,240.
Non-Final Rejection dated Dec. 14, 2018 for U.S. Appl. No. 15/938,260.
Non-Final Rejection dated Jan. 2, 2019 for U.S. Appl. No. 15/938,252.
Non-Final Rejection dated Jan. 10, 2019 for U.S. Appl. No. 15/938,276.
Non-Final Rejection dated Nov. 29, 2018 for U.S. Appl. No. 15/424,595.
Notice of Allowance and Fees Due (PTOL-85) dated May 9, 2019 for U.S. Appl. No. 15/424,595.
International Search Report and Written Opinion for PCT/US2019/024483 dated Sep. 20, 2019.
International Search Report and Written Opinion for PCT/US2019/024545 dated Sep. 20, 2019.

\* cited by examiner

METHOD AND APPARATUS FOR FACILITATING FRICTIONLESS TWO-FACTOR AUTHENTICATION

CROSS REFERENCE TO RELATED APPLICATIONS

This application claims priority to U.S. Provisional Application No. 62/290,491, filed Feb. 3, 2016, U.S. Provisional Application No. 62/313,845, filed Mar. 28, 2016, U.S. Provisional Application No. 62/325,478, filed Apr. 21, 2016, and U.S. Provisional Application No. 62/416,210, filed Nov. 2, 2016, the entire contents of each of which are incorporated herein by reference.

TECHNOLOGICAL FIELD

Embodiments described herein generally relate to frictionless two-factor authentication. In particular, embodiments described herein relate to providing authentication of access while reducing user input and, specifically to a method, apparatus, and computer program product for receiving device identification information from both a secured system indicating devices with authorization and from a network provider indicating the device attempting to access the secured system.

BACKGROUND

While conventional two-factor authentication does provide some heightened security with regard to standard login processes, it has yet to be widely adopted, in part, due to the inconvenience caused to the user.

In this regard, areas for improving known, existing and/or conventional authentication systems have been identified. Through applied effort, ingenuity, and innovation, solutions to improve such systems have been realized and are described in connection with embodiments of the present invention.

Overview

With IoT (the internet of things), hackers now have access to our physical world, and without adequate security/authentication, are able to unlock others' locks, commandeer their cars, and even disable or destroy critical infrastructure such as dams and power grids.

By first verifying the mobile device identity of the unlocking device, embodiments of the present invention are able to better protect both personal and public IoT assets against the looming threat. In some embodiments, ownership of the device, for example, through the device's own biometrics and the proximity to the IoT device may also be utilized for authentication.

Computing devices (e.g., mobile devices utilizing mobile apps, computers using browsers, kiosks designed for a particular purpose) are widespread and, coupled with single-sign-on systems for electronic account access (e.g., "logging in"), are used for everything from on-line banking, unlocking your home or car, accessing your social networking environment, buying and selling tickets, etc. Most common, a username and password is required, but have been found to be very easy to crack, as many users are too forgetful or lazy to create secure passwords. Conventional two-factor authentication may help, but is full of friction—a user probably may have their username and password saved, but conventional two-factor authentication requires them to wait for a code and then input the code before having access.

Embodiments of the present invention provide the safety of 2FA but require none of the friction of waiting for and subsequently entering the code. Other embodiments combine the process of frictionless two-factor authentication with one or both a biometric input (e.g., a fingerprint, retinal scan, or the like) and location data, to authenticate both the device and one or both possession thereof or proximity thereto before, for example, unlocking your home or car or allowing access to your bank account.

BRIEF SUMMARY

Embodiments described herein provide frictionless two-factor authentication. In particular, a method, apparatus, and computer program product are provided for receiving device identification information from both a secured system indicating devices with authorization and from a network provider indicating the device attempting to access the secured system to authenticate access.

In some embodiments, a method may be provided for performing frictionless two-factor authentication, the method comprising receiving, from a first entity, an indication of a request received at the first entity to access an account from a device associated with a user, the indication comprising at least one instance of first device identification information of at least one device having authorization to access the account, providing a network address to the first entity, the network address configured to be sent to the device from the first entity, receiving, from a second entity, second device identification information, the second device identification information determined upon the device accessing to the network address, performing a real-time comparison between the first device identification information and second device identification information, and prompting the first entity to grant the device access to the account if a match is detected between the first device identification information and second device identification information.

In some embodiments, the network address is a uniform resource locator (URL) address. In some embodiments, the first entity is a bank server. In some embodiments, the second entity is a cellular network provider or a cable network provider. In some embodiments, the method may further comprise determining a confidence level of (i) the first device identification information and (ii) the second device identification information match.

In some embodiments, the method may further comprise normalizing the first device identification information and the second device identification information, and determining whether (i) the normalized first device identification information and (ii) the normalized second device identification information match.

In some embodiments, the first device identification information and the second device identification information is at least one of a telephone number, a device serial number, a unique serial number (ICCID), an international mobile subscriber identity (IMSI) number, or an International Mobile Equipment Identity (IMEI).

In some embodiments, the method may further comprise receiving a first set of biometric data from the first entity, the first set of biometric data used at log in at the first entity, receiving a second set of biometric data from the second entity, the second set of biometric data used when accessing the network address, and performing a comparison between the first set of biometric data and the second set of biometric data.

In some embodiments, an apparatus may be provided for performing frictionless two-factor authentication, the apparatus comprising at least one processor and at least one memory including computer program code, the at least one memory and the computer program code configured to, with the processor, cause the apparatus to at least receive, from a first entity, an indication of a request received at the first entity to access an account from a device associated with a user, the indication comprising at least one instance of first device identification information of at least one device having authorization to access the account, provide a network address to the first entity, the network address configured to be sent to the device from the first entity, receive, from a second entity, second device identification information, the second device identification information determined upon the device accessing to the network address, perform a real-time comparison between the first device identification information and second device identification information, and prompt the first entity to grant the device access to the account if a match is detected between the first device identification information and second device identification information.

In some embodiments, the network address is a uniform resource locator (URL) address. In some embodiments, the first entity is a bank server. In some embodiments, the second entity is a cellular network provider or a cable network provider.

In some embodiments, the at least one memory and the computer program code are further configured to, with the processor, cause the apparatus to determine a confidence level of (i) the first device identification information and (ii) the second device identification information match.

In some embodiments, the at least one memory and the computer program code are further configured to, with the processor, cause the apparatus to normalize the first device identification information and the second device identification information, and determine whether (i) the normalized first device identification information and (ii) the normalized second device identification information match.

In some embodiments, the first device identification information and the second device identification information is at least one of a telephone number, a device serial number, a unique serial number (ICCID), an international mobile subscriber identity (IMSI) number, or an International Mobile Equipment Identity (IMEI).

In some embodiments, the at least one memory and the computer program code are further configured to, with the processor, cause the apparatus to receive a first set of biometric data from the first entity, the first set of biometric data used at log in at the first entity, receive a second set of biometric data from the second entity, the second set of biometric data used when accessing the network address, and performing a comparison between the first set of biometric data and the second set of biometric data.

In some embodiments, a computer program product may be provided for performing frictionless two-factor authentication, the computer program product comprising at least one non-transitory computer-readable storage medium having computer-executable program code instructions stored therein, the computer-executable program code instructions comprising program code instructions for receiving, from a first entity, an indication of a request received at the first entity to access an account from a device associated with a user, the indication comprising at least one instance of first device identification information of at least one device having authorization to access the account, providing a network address to the first entity, the network address configured to be sent to the device from the first entity, receiving, from a second entity, second device identification information, the second device identification information determined upon the device accessing to the network address, performing a real-time comparison between the first device identification information and second device identification information, and prompting the first entity to grant the device access to the account if a match is detected between the first device identification information and second device identification information.

In some embodiments, the network address is a uniform resource locator (URL) address. In some embodiments, the first entity is a bank server. In some embodiments, the second entity is a cellular network provider or a cable network provider.

In some embodiments, the computer-executable program code instructions further comprise program code instructions for determining a confidence level of (i) the first device identification information and (ii) the second device identification information match.

In some embodiments, the computer-executable program code instructions further comprise program code instructions for normalizing the first device identification information and the second device identification information, and determining whether (i) the normalized first device identification information and (ii) the normalized second device identification information match.

In some embodiments, the first device identification information and the second device identification information is at least one of a telephone number, a device serial number, a unique serial number (ICCID), an international mobile subscriber identity (IMSI) number, or an International Mobile Equipment Identity (IMEI).

In some embodiments, the computer-executable program code instructions further comprise program code instructions for receiving a first set of biometric data from the first entity, the first set of biometric data used at log in at the first entity, receiving a second set of biometric data from the second entity, the second set of biometric data used when accessing the network address, and performing a comparison between the first set of biometric data and the second set of biometric data.

In some embodiments, an apparatus may be provided for performing frictionless two-factor authentication, the apparatus comprising means for receiving, from a first entity, an indication of a request received at the first entity to access an account from a device associated with a user, the indication comprising at least one instance of first device identification information of at least one device having authorization to access the account, means for providing a network address to the first entity, the network address configured to be sent to the device from the first entity, means for receiving, from a second entity, second device identification information, the second device identification information determined upon the device accessing to the network address, means for performing a real-time comparison between the first device identification information and second device identification information, and means for prompting the first entity to grant the device access to the account if a match is detected between the first device identification information and second device identification information.

In some embodiments, the network address is a uniform resource locator (URL) address. In some embodiments, the first entity is a bank server. In some embodiments, the second entity is a cellular network provider or a cable network provider.

In some embodiments, the apparatus may further comprise means for determining a confidence level of (i) the first device identification information and (ii) the second device identification information match.

In some embodiments, the apparatus may further comprise means for normalizing the first device identification information and the second device identification information, and means for determining whether (i) the normalized first device identification information and (ii) the normalized second device identification information match.

In some embodiments, the first device identification information and the second device identification information is at least one of a telephone number, a device serial number, a unique serial number (ICCID), an international mobile subscriber identity (IMSI) number, or an International Mobile Equipment Identity (IMEI).

In some embodiments, the apparatus may further comprise means for receiving a first set of biometric data from the first entity, the first set of biometric data used at log in at the first entity, means for receiving a second set of biometric data from the second entity, the second set of biometric data used when accessing the network address, and means for performing a comparison between the first set of biometric data and the second set of biometric data.

BRIEF DESCRIPTION OF THE DRAWINGS

Figure 1:
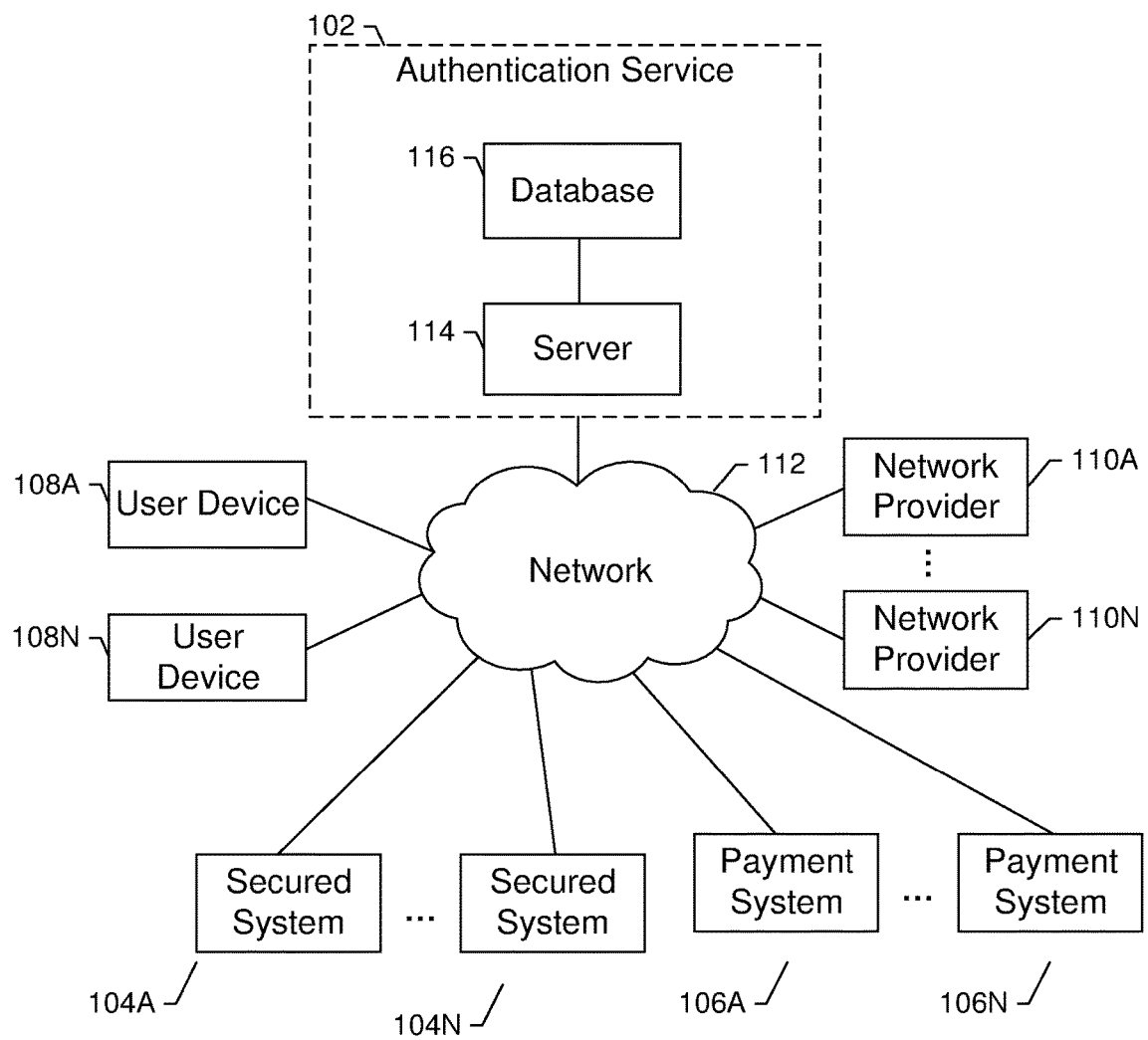
Figure 2:
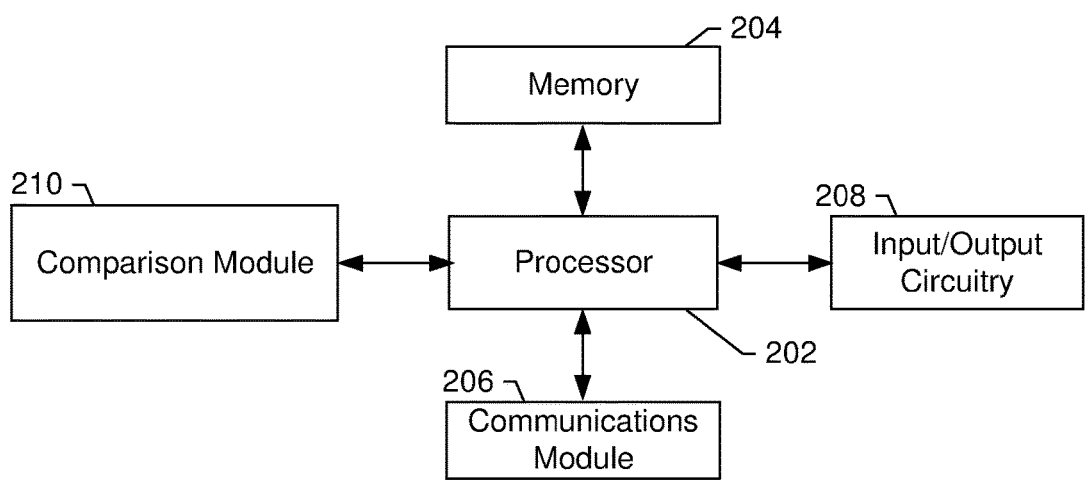
Figure 3:
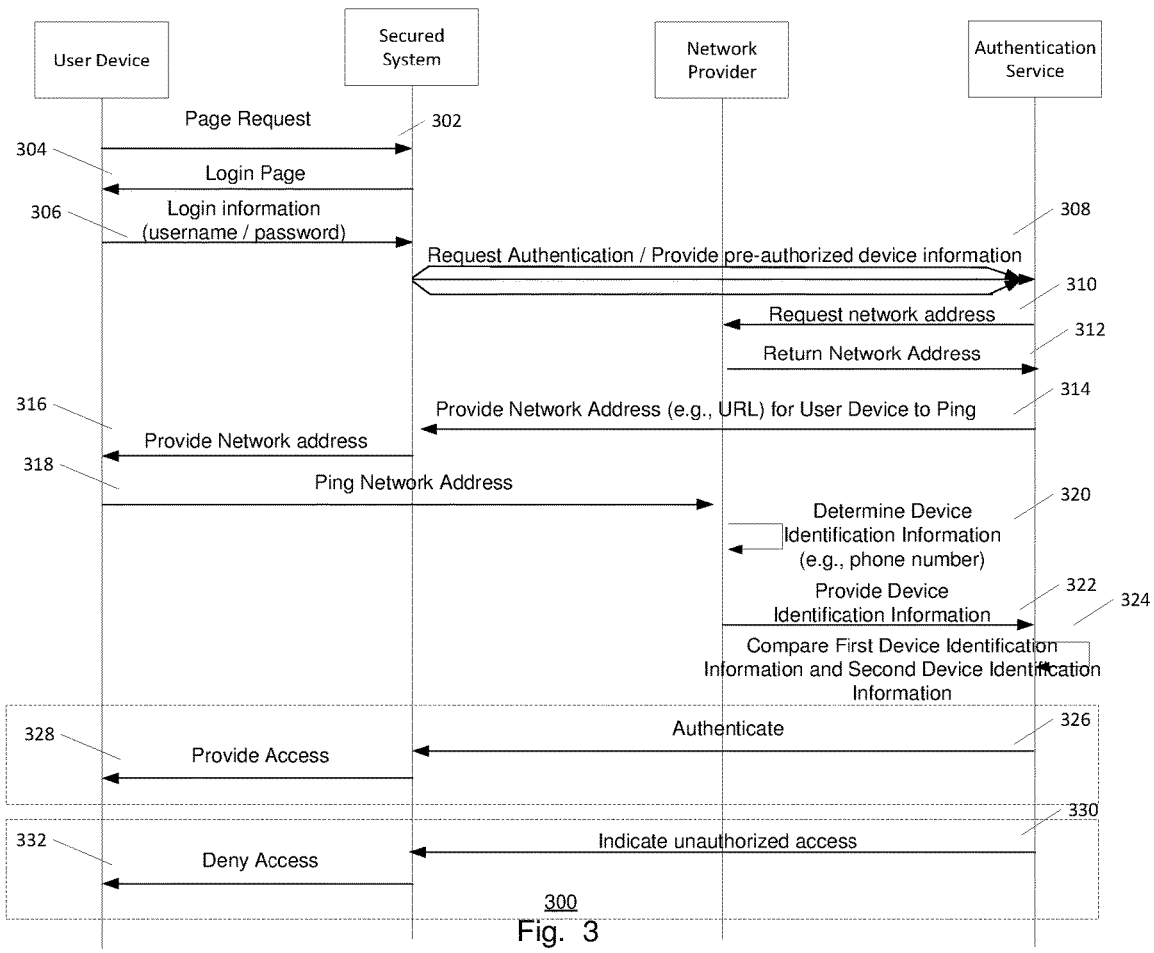
Figure 4A:
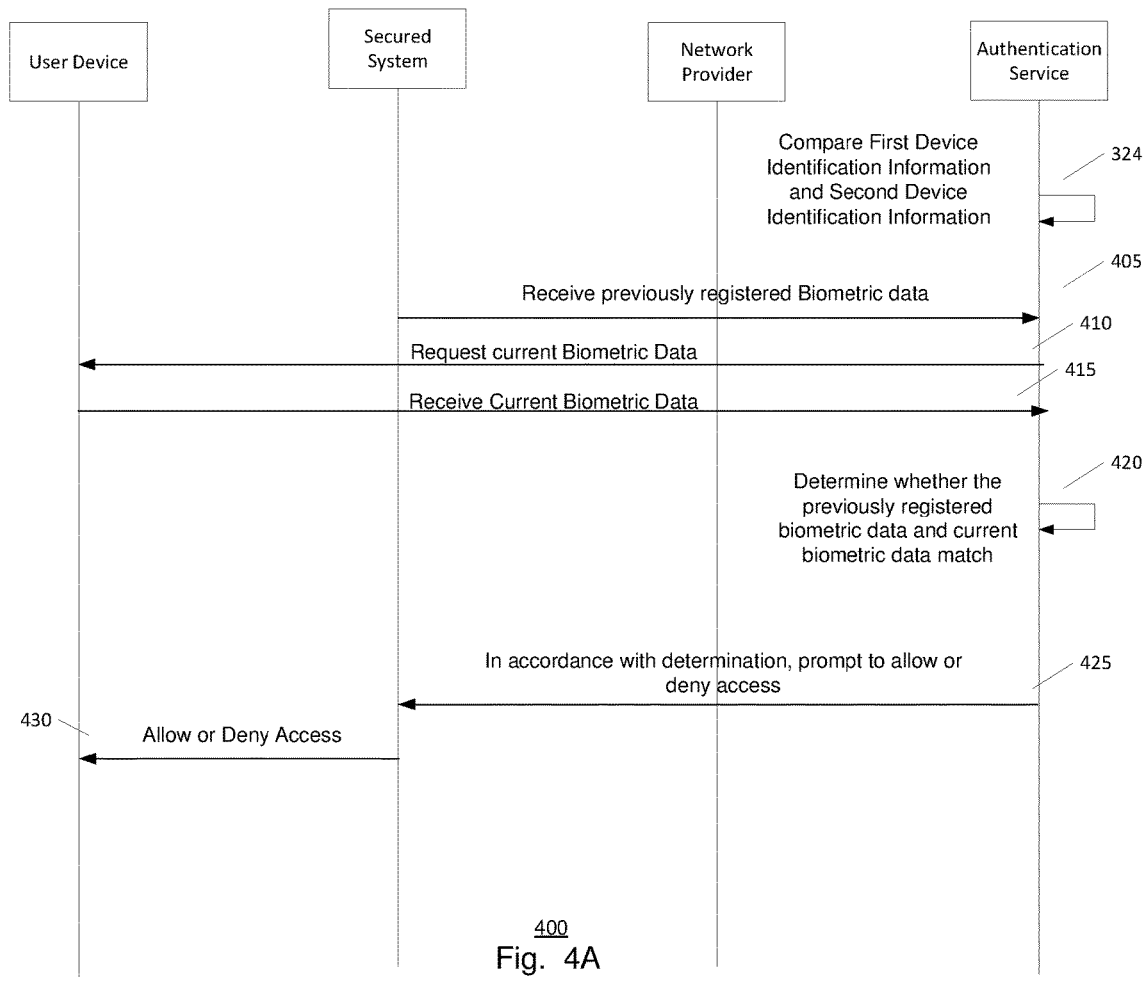
Figure 4B:
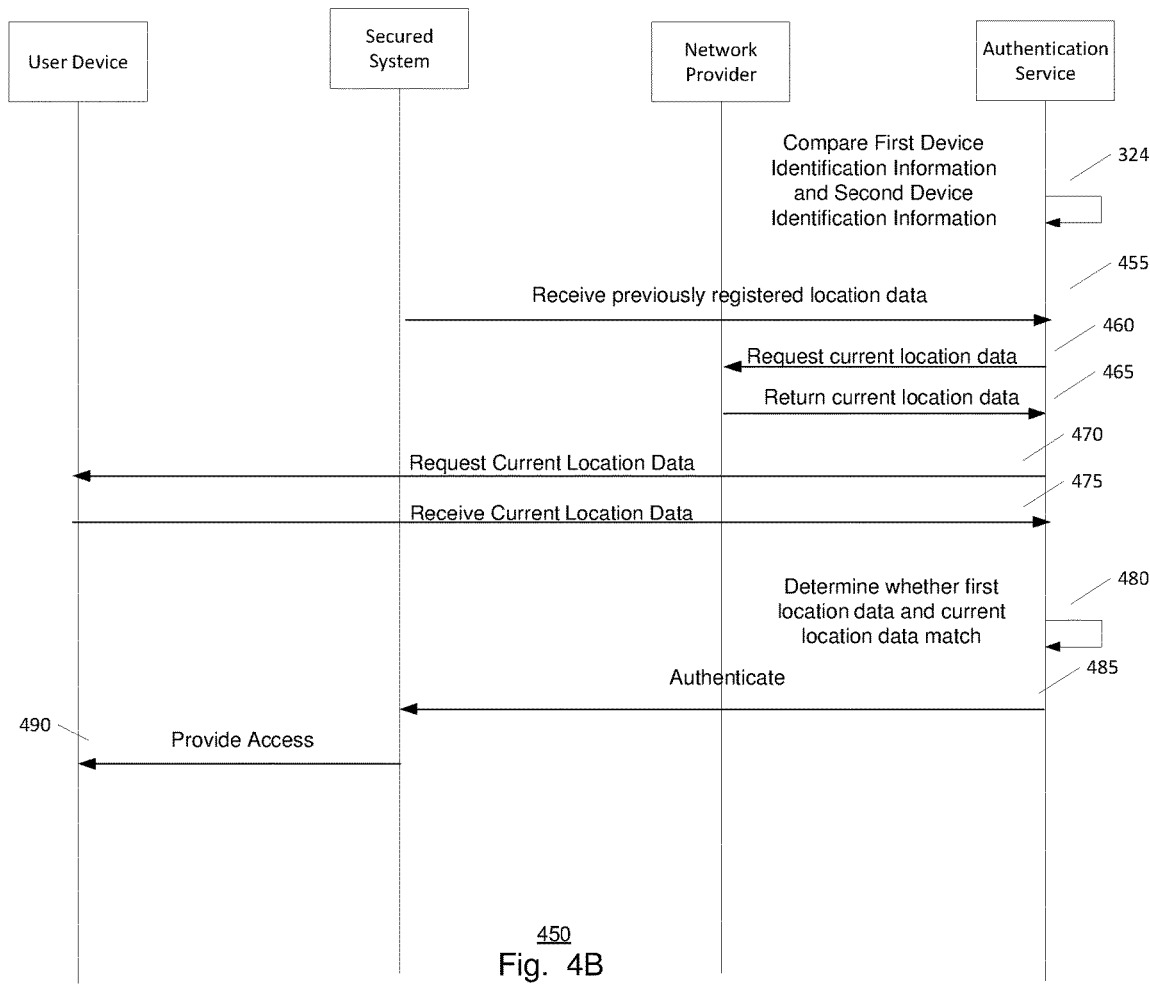
Figure 5:
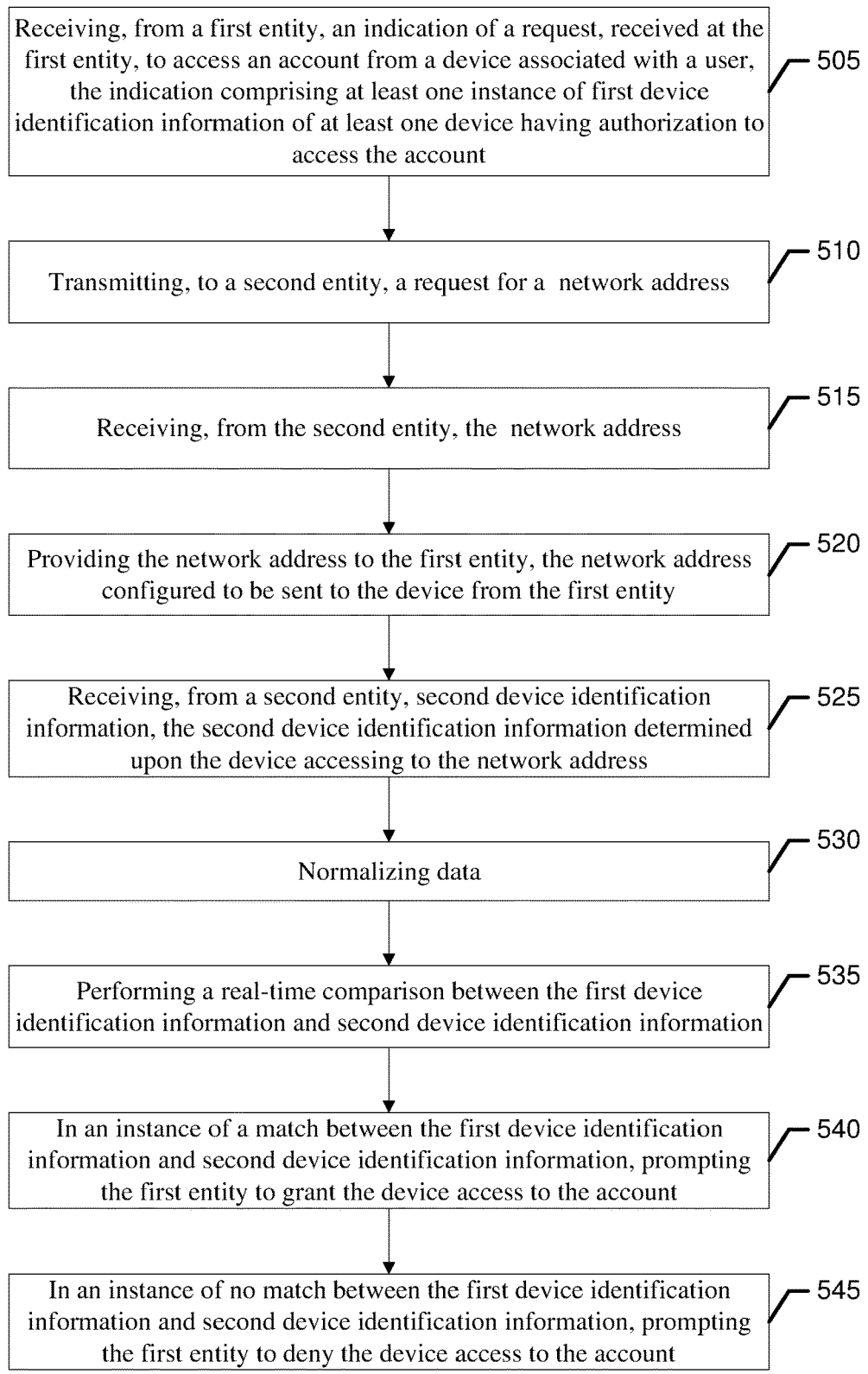
Figure 6A:
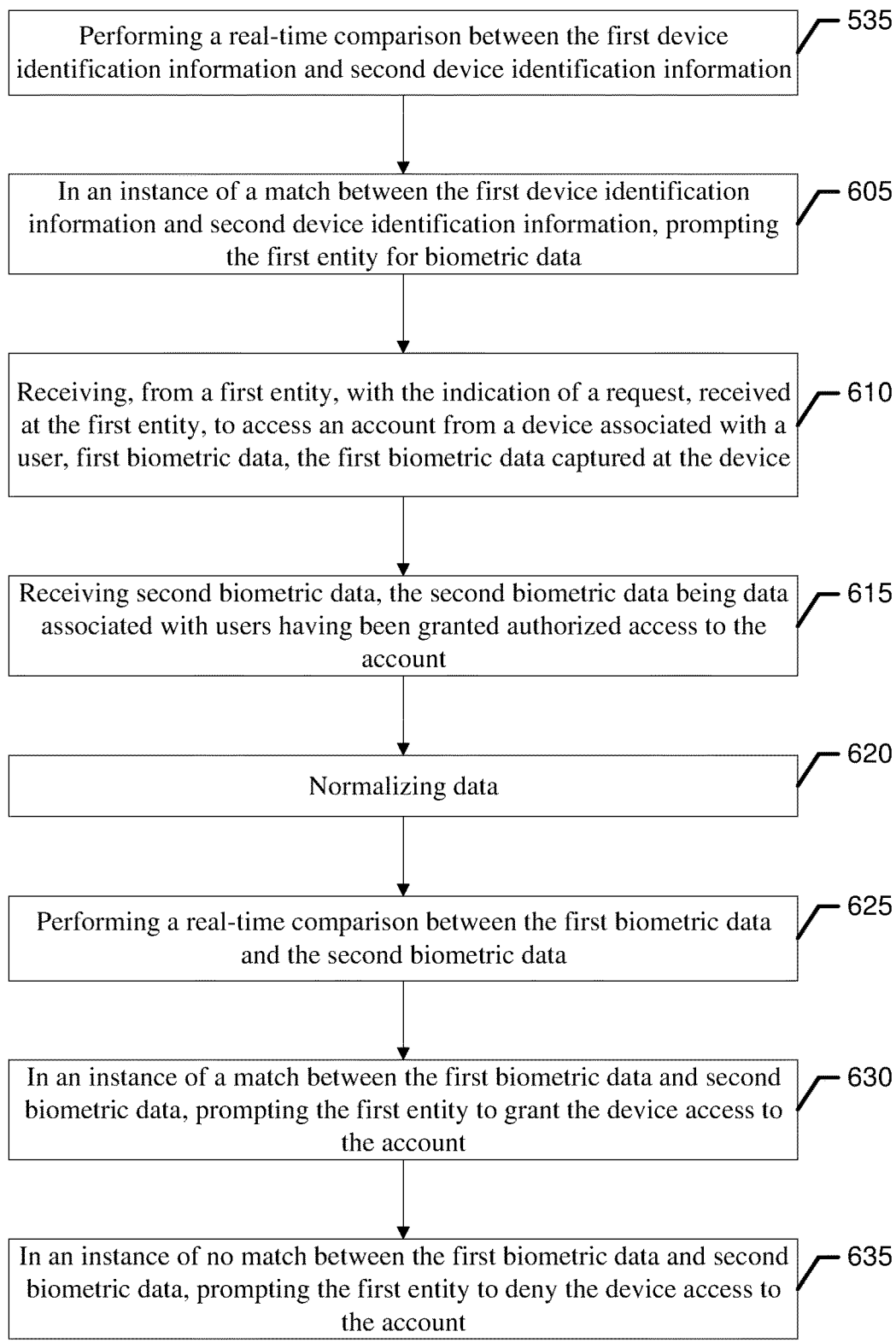
Figure 6B:
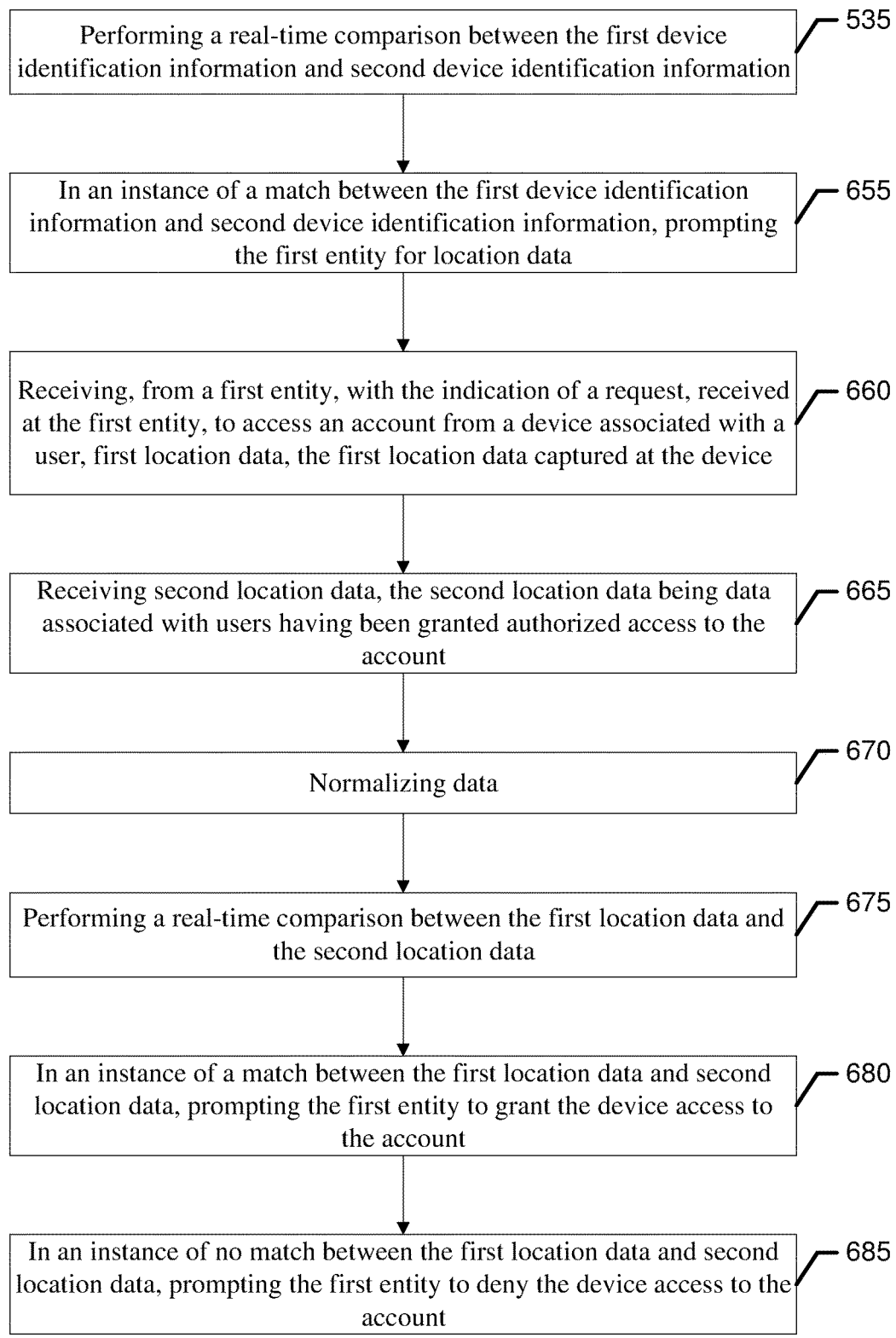

Having thus described embodiments of the invention in general terms, reference will now be made to the accompanying drawings, which are not necessarily drawn to scale, and wherein:

FIG. 1 is a block diagram of a system that may be specifically configured in accordance with an example embodiment of the present invention;

FIG. 2 is a block diagram of an apparatus that may be specifically configured in accordance with an example embodiment of the present invention;

FIGS. 3, 4A, and 4B are data flow diagrams, each showing an exemplary operation of an example system in accordance with an embodiment of the present invention; and FIGS. 5, 6A, and 6B depict flowcharts, each showing an exemplary method of operating an example apparatus in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

Moreover, the term "exemplary", as may be used herein, is not provided to convey any qualitative assessment, but instead merely to convey an illustration of an example.

Thus, use of any such terms should not be taken to limit the spirit and scope of embodiments of the present invention.

The term "device identification information" as used herein refers to any information that may identify a computing device. For example, device identification information may refer to a user's subscriberID, which may be similar or the same as a mobile device's phone number/ CallerID number, the mobile device's phone number, the mobile device's callerID number, International Mobile Equipment Identity (IMEI)/unique serial number (ICCID) data, network-based, MAC addresses, billing record's modem certificate, DOCSIS hub/Media Access Layer routing assignments, Cable modem's certificate, device serial number, etc., Intel vPro and Trusted Platform Module key, or the like. Device identification information may be stored, transmitted, and/or received, in some embodiments, in a hashed, one-way hashed, encrypted, digitally signed, using public/private key encryption or other means of encrypting, or other similar algorithms (e.g., for system/customer/bank/ wireless network/other privacy or other reasons) data form.

A "network provider" as used herein may be, for example, wireless network provider (e.g., Verizon, AT&T, T-Mobile, etc.) which may have data such as a user's name, billing address, equipment installation address, birthdate, tower routing/router information to the user's wireless device (e.g., mobile phone), IP WAN address, IP LAN address, IP DMZ info, wireless device equipment information (serial number, certificate number, model number, IMEI number etc.), and other information, that it could similarly supply to a third-party.

Similarly, a "network provider" may be, for example, in those embodiments in which a user may access the internet through a wired connection (e.g., via cable, DSL, any non-wireless-phone-carrier means such as via a satellite dish system), a wired network provider. For example, a user's cable company (for example—cox cable) may have data such as a user's name, billing address, equipment installation address, birthdate, among other fields, cable wire routing/router information to the user's cable modem (home), IP WAN address, IP LAN address, IP DMZ info, cable modem equipment information (serial number, certificate number, model number, etc.), and other information, that it could similarly supply to a third-party.

A "secured system" as used herein may refer to, for example, any organization, person, company, government, or other entity seeking to provide a secure data environment, including, for example, a bank, an e-commerce company, an entertainment company, an IOT device/company, (IOT meaning internet of things), a fintech company, a social web company, a file storage company, or the like.

As used herein, a "match" may be detected, determined, and/or reported in, for example, a binary form or a more granular form (e.g., a score, for example, ranging from 0-100 or the like).

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more user devices, network operators/providers, and providers of secured platforms, and payment systems (e.g., banking systems, payment systems, e-commerce platforms, IoT devices, IoT device company or any other organization, person, company, government, or other entity such as a fintech company, a social web platform or company, a file storage platform or company.). Additionally or alternatively, the networked device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 shows an example computing system within which embodiments of the present invention may operate. In particular, authentication service 102, which may comprise server 114 and database 116, may be operable to receive first device identification information from secured system 104 indicative of, for example, a user or a device having pre-authorized access to secured system 104, receive second device identification information indicative of the actual user or device attempting to gain access to the secured system 104, compare the first and second device identification information, and in an instance in which they match, prompt the secured system 104 to allow access. Authentication service 102 may be embodied by, for example, a web server, a cloud server, a Linux or LAMP server stack, a windows server, a mobile device, and be connected to the internet, wireless communication infrastructure, and associated routers and other related devices The server 114 may be embodied as a single computer or multiple computers and may provide for authenticating user and/or device access to secured systems 104A-104N. Database 116 may be embodied as a data storage device such as a Network Attached Storage (NAS) device or devices, or as a separate database server or servers. Database 116 includes information accessed and stored by the server 114 to facilitate the operations of the authentication service 102.

Returning to FIG. 1, users operating, for example, user devices 108A-108N may access or attempt to access secured systems 104A-104N via a network 112 (e.g., the internet, or the like). In some embodiments, the data traffic may be routed through or otherwise be managed by the network provider 110A-110N. The secured systems 104A-104N may access the authentication service 102 via network 112 to, for example, authenticate the user and/or device attempting to access the system. In an e-commerce embodiment, user devices 108A-108N and/or secured systems 104A-104N may access or attempt to access, via a network 112, payment systems 106A-106N.

The user devices 108A-108N may be any computing device as known in the art and operated by a user. Electronic data received by secured systems 104A-104N, payment systems 106A-106N, or the network provider 110A-110N from the user devices 108A-108N may be provided in various forms and via various methods. The user devices 108A-108N may include mobile devices, such as laptop computers, smartphones, netbooks, tablet computers, wearable devices (e.g., electronic watches, wrist bands, glasses, etc.), and the like. Such mobile devices may provide requests or search queries to or otherwise attempt to access secured system 104.

In embodiments where a user device 108A-108N is a mobile device, such as a smart phone or tablet, the user device 108A-108N may execute an "app" or "user application" to interact with secured systems 104A-104N, payment systems 106A-106N and/or network provider 110A-110N. Such apps are typically designed to execute on mobile devices, such as tablets or smartphones, without the use of a browser. For example, an app may be provided that executes on mobile device operating systems such as Apple Inc.'s iOS®, Alphabet Inc.'s Android®, or Microsoft Corp.'s Windows 10®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of users. In some embodiments, a mobile operating system may also provide for improved communication interfaces for interacting with external devices (e.g., home and/or or automobile security and/or automation systems, navigation systems, and the like).

Communication with hardware and software modules executing outside of the app is typically provided via application programming interfaces (APIs) provided by the mobile device operating system.

Additionally or alternatively, user devices 108A-108N may interact through the secured systems 104A-104N and/or payment systems 106A-106N via a web browser. As yet another example, the user devices 108A-108N may include various hardware or firmware designed to interface with the one or more secured systems 104A-104N and/or payment systems 106A-106N (e.g., where the user devices 108A-108N is a purpose-built device offered for the primary purpose of communicating with secured systems 104A-104N and/or payment systems 106A-106N, such as a store kiosk).

Again, referring back to FIG. 1, System 100 supports communications between user devices 108A-108N and the secured systems 104A-104N and/or payment systems 106A-106N, via network 112. While the system 100 may support communication via 5G, an Long Term Evolution (LTE) or LTE-Advanced (LTE-A) network, some embodiments may also support communications between the user devices 108A-108N and the secured system 104 including those configured in accordance with wideband code division multiple access (W-CDMA), CDMA2000, global system for mobile communications (GSM), general packet radio service (GPRS), the IEEE 802.11 standard including, for example, the IEEE 802.11ah or 802.11ac standard or other newer amendments of the standard, wireless local access network (WLAN), Worldwide Interoperability for Microwave Access (WiMAX) protocols, universal mobile telecommunications systems (UMTS) terrestrial radio access network (UTRAN) and/or the like, as well as other standards, for example, with respect to multi-domain networks, that may include, industrial wireless communication networks such as Bluetooth, ZigBee etc. and/or the like.

Secured systems 104A-104N and/or payment systems 106A-106N may be embodied by any of a variety of network entities, such as, for example, a server or the like. In other embodiments, the network entities may include mobile telephones, smart phones, portable digital assistants (PDAs), desktop computers, laptop computers, tablet computers any of numerous other hand held or portable communication devices, computation devices, content generation devices, content consumption devices, (e.g., mobile media player, a virtual reality device, a mixed reality device, a wearable device, a virtual machine, a cloud-based device or combinations thereof), Internet of Thing (IoT) devices, sensors, meters, or the like.

For example, the IoT devices, sensors, and/or meters may be deployed in a variety of different applications including in home and/or automobile security and/or automation applications to serve, for example, in environmental monitoring applications, in industrial process automation applications, vehicular or transportation automation application, in healthcare and fitness applications, in building automation and control applications and/or in temperature sensing applications.

The authentication service 102 and/or server 114 may be embodied as or otherwise include an apparatus 200 that is specifically configured to perform the functions of the respective device, as generically represented by the block diagram of FIG. 2. While the apparatus may be employed, for example, as shown in FIG. 2, it should be noted that the components, devices or elements described below may not be mandatory and thus some may be omitted in certain embodiments. Additionally, some embodiments may include further or different components, devices or elements beyond those shown and described herein.

Apparatus Architecture

Regardless of the type of device that embodies the authentication service 102 or server 112, authentication service 102 or server 112 may include or be associated with an apparatus 200 as shown in FIG. 2. In this regard, the apparatus may include or otherwise be in communication with a processor 202, a memory device 204, a communication interface 206, a user interface 208, and comparison module 210. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 202 (and/or co-processors or any other processing circuitry assisting or otherwise associated with the processor) may be in communication with the memory device 204 via a bus for passing information among components of the apparatus. The memory device may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus 200 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by authentication service 102 or server 114 configured to employ one or more example embodiments of the present invention. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 208.

Meanwhile, the communication interface 206 may be any means such as a device or circuitry embodied in either hardware or a combination of hardware and software that is configured to receive and/or transmit data. In this regard, the communication interface 206 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with wearable device (e.g., head mounted displays), such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 208 may be in communication with the processor 202, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (for example, near-eye-display), in the air, etc. The user interface may also be in communication with the memory 204 and/or the communication interface 206, such as via a bus.

Data Flow

FIG. 3 depicts an example data flow 300 illustrating interactions between a user device, for example, a user device 302 such as one of user devices 108A-108N, a secured system 304 such as one of Secured systems 104A-104N, a network provider 306 such as one of network providers 110A-110N and authentication system 102. The data flow 300 illustrates how electronic information may be passed among various systems in accordance with embodiments of the present invention.

At step 302, user device 350 transmits data (e.g., a page request) or, for example in some embodiments, launches an API, attempting to access secured system 360. At 304, a login page is provided and a user, operating user device 306, provides login credentials. In some embodiments, login credentials are saved and the providing of the login credentials requires no instant input from the user.

The secured system, requiring two-factor authentication, then at step 308 requests authentication of the user device by providing an authentication request and, for example first device identification information to the authentication service 380. The first device identification information may comprise one or more phone numbers for each of one or more user devices having pre-authorized access to the secured system. For example, when registering or at a previous login, a user may provide a list of authorized devices and/or device identification information of authorized devices, giving them access to the account.

The system, in an effort to determine the identification information of the user device that is currently attempting access to the secured system may perform one or more of a number of processes. Generally, the system may be configured to direct the user device to a destination where the identification information may be determined, detected, identified, or otherwise accessed. For example, the user device may be provided with a URL to ping, an app to which to connect, or the like. The destination may be received from, in some embodiments, the secured system, while in other embodiments, the destination may be received from authentication service. The destination may be provided directly to the user device, to a browser executing thereon, to an app executing there, via an API call, via a bot, by sending an SMS message thereby requiring a click, via a notification from an app, or any other form of, for example, user-to-machine electronic communication.

The authentication service 380 may, for example, at step 310 request a network address and at step 312 receive the network address, the network address, for example, may be a URL or the like configured to be passed to the secured system or directly to the user device, for the user device to ping or otherwise access. As such, at step 314, the authentication service provides the network address to the secured system and at step 316, the network address is provided to the user device. At step 318, the user device pings or otherwise access the network address, where, for example, the network provider, at step 320, receives, reads, extracts, or otherwise determines the device identification information, for example, from a packet header.

In particular, a user device may store or otherwise be associated with identification information. For example, in a mobile context, a subscriber identification module (SIM), Universal Subscriber Identity Module (USIM), a Removable User Identity Module (R-UIM), or a CDMA Subscriber Identity Module (CSIM), any of which may be a software application or integrated circuit, for example, stored on a SIM card or Universal Integrated Circuit Card (UICC), may comprise at least a unique serial number (ICCID) or an international mobile subscriber identity (IMSI) number. The SIM card, as referred to herein, may be a mini, micro, nano, virtual, or emdedded(e) SIM.

At step 322, the network provider provides and the authentication service receives the second device identification information, which indicates the device identification information of the device attempting to access secured system 360. In an instance in which no device identification of the device attempting to access secured system 360 (e.g., second device identification information) is available or able to be determined, detected, identified, or otherwise accessed, the authentication service may be configured to perform a different process for two-factor authentication where, for example, the authentication service, utilizing the first identification information provides a code or the like to the user device, and the request the user to provide, via the user device, the code (e.g., input into the app or browser) to the secured system, for example, which may have the authentication session open.

At step 324, the authentication service compares the first device identification information and the second device identification information. In some embodiments, as one of ordinary skill in the art would understand, the first device identification information as received from the secured system and/or the second device identification information as received from the network provider may be raw, tokenized, hashed, or otherwise transcoded, for example, for security reasons. The comparison may first involve, for example, decoding the device identification information and comparing raw data or comparing transcoded information. The comparison may also involve, in some embodiments, normalization of the device identification information. That is, the first identification information may be in a convenient format, for example, for input or display within the user's online account—which may or may not include elements such as punctuation (e.g., dashes, parentheses, brackets, or the like), country codes, spaces, etc. the comparison may simply ignore such elements, strip the elements, or otherwise clean the data, etc.

In some embodiments, because page requests are monitored, directed, or otherwise pass through network provider 370, the second device identification information may be passed to the secured system at the initial request—enabling the secured system to pass data, for example, the data packet header, which may be tokenized, hashed, or otherwise transcoded, to the authentication system with or after the first device identification information.

Upon making the comparison, the authentication service 380, at step 326, in an instance in which the comparison determines that a match exists between for example, the first device identification information and the second device identification information, may authenticate and/or prompt the secured system to authenticate or grant access to the user device. The secured system may then, at step 328, grant access to the user device.

However, in an instance in which the comparison determines that no match exists between for example, the first device identification information and the second device identification information, the authentication service 380, at step 330, may notify and/or prompt the secured system indicating its inability to authenticate. The secured system may then, at step 332, deny access to the user device.

FIG. 4A depicts an example data flow 400 illustrating interactions between a user device, for example, a user device 302 such as one of user devices 108A-108N, a secured system 304 such as one of secured systems 104A-104N, a network provider 306 such as one of network providers 110A-110N and authentication system 102. The data flow 300 illustrates how electronic information may be passed among various systems in accordance with embodiments of the present invention, and in particular, FIG. 4 shows how the use of biometric data may augment or otherwise aid in the authentication process of FIG. 3.

In some embodiments, upon a determination that the first device identification information matches the second device identification information, the secured system and/or the authentication service may be configured to perform additional authentication. While in other embodiments, the secured system and/or the authentication service may be configured to perform authentication using both the frictionless two-factor authentication shown in FIG. 3 as well as biometric data. That is, in an instance in which both the frictionless two-factor authentication shown in FIG. 3 as well as biometric data are used in parallel, the secured system may be configured to provide, at step 308, for example, biometric data of one or more users having been previously authorized to access the system. In other embodiments, for example, as shown in FIG. 4A, biometric data may be provided upon the determination that the first device identification information matches the second device identification information.

Regardless of when the biometric data of one or more users having been previously authorized to access the system is received, as shown at step 410, the authentication service may request the biometric data of the user operating the device currently attempting to access the secured system, and at step 415, that biometric data is received. Subsequently, at step 420, the authentication service may be configured to determine whether the previously registered biometric data and current biometric data match.

Similar to FIG. 3, in an instance in which the comparison determines that a match exists between for example, the previously registered biometric data and current biometric data, the authentication service, at step 425, may authenticate and/or prompt the secured system to authenticate or grant access to the user device. The secured system may then, at step 430, grant access to the user device.

However, in an instance in which the comparison determines that no match exists, the authentication service 380 may notify and/or prompt the secured system that the match as not made. The secured system may then deny access to the secured system.

FIG. 4B depicts an example data flow 400 illustrating interactions between a user device, for example, a user device 302 such as one of user devices 108A-108N, a secured system 304 such as one of secured systems 104A-104N, a network provider 306 such as one of network providers 110A-110N and authentication system 102. The data flow 300 illustrates how electronic information may be passed among various systems in accordance with embodiments of the present invention, and in particular, FIG. 4 shows how the use of location data may augment or otherwise aid in the authentication process of FIG. 3.

In some embodiments, upon a determination that the first device identification information and the second device identification information match, the secured system and/or the authentication service may be configured to perform additional authentication. In other embodiments, the secured system and/or the authentication service may be configured to perform authentication using both the frictionless two-factor authentication shown in FIG. 3 as well as location data.

In an instance in which both the frictionless two-factor authentication shown in FIG. 3 as well as location data are used in parallel, the secured system may be configured to provide, at step 308 for example, location data of one or more users having been previously authorized to access the system. In other embodiments, for example, as shown in FIG. 4B, location data may be provided upon the determination that the first device identification information matches the second device identification information.

Furthermore, in an instance in which both the frictionless two-factor authentication shown in FIG. 3 as well as location data are used in parallel, the network provider may be configured to provide, for example, at step 322, location data of the user device currently attempting to access the secured system. Similar to the device identification information, the user device, for example, within a data packet header or the like, may provide location information to the network provider, while in other embodiments, the network provider may determine the location, within a particular variance, based on where the connection is made. In other embodiments, for example, as shown in FIG. 4B, location data may be provided upon the determination that the first device identification information matches the second device identification information.

If however, the location data of one or more users having been previously authorized to access the system has not been received previously, as shown at step 455, the authentication service may request and receive the location data of one or more users having been previously authorized to access the secured system.

In an instance in which the location data of the user device currently attempting to access the secured system has not been received previously, as shown at step 460, the authentication service may request and, at step 465, receive, from the network provider, the location data of the user device currently attempting to access the secured system. In another embodiment, which may also be performed, as shown at step 470, the authentication service may request from the user device, and, at step 475, receive, from the user device, the location data of the user device currently attempting to access the secured system. Subsequently, at step 480, the authentication service may be configured to determine whether the previously registered location data and current location data match.

Similar to FIG. 3, in an instance in which the comparison determines that a match exists between for example, the previously registered location data and current location data, the authentication service, at step 485, may authenticate and/or prompt the secured system to authenticate or grant access to the user device. The secured system may then, at step 490, grant access to the user device. However, in an instance in which the comparison determines that no match exists, the authentication service 380 may notify and/or prompt the secured system that the match as not made. The secured system may then deny access to the secured system.

Exemplary Operation for Implementing Embodiments of the Present Invention

In some embodiments, apparatus 200 may be configured to perform frictionless two-factor authentication. FIGS. 5, 6A, and 6B illustrate exemplary processes for determining whether to authenticate a user device, prompting the approval or denial of access to an account.

Receiving an Authentication Request

FIG. 5 illustrates a flow diagram depicting an example of a process 500 for authenticating a device in accordance with embodiments of the present invention. The process illustrates how, upon reception of the authentication request, an authentication system or an API related thereto may receive identification information of devices having previously given authorization to access a secured system (e.g., a banking account) and identification information of a device currently attempting to access the secured system, and upon reception, performing a real-time match to determine whether to prompt the secured system to allow access. The process 500 may be performed by an apparatus, such as the apparatus 200 described above with respect to FIG. 2.

A first entity (e.g., a secured system as described above, which may include, for example, an online banking platform) may receive the login credentials to an account. Upon receiving the login credentials, the first entity opens an authentication session, for example, via an API provided by the authentication service. As such, as shown in block 505 of FIG. 5, an apparatus, for example, apparatus 200 embodied by, for example, authentication service 102, server 114, or the like, may be configured to receive, from a first entity, an indication of a request. In some embodiments, the request is or was received at the first entity, to access an account from a device associated with a user. The indication of the request, as received at the authentication service may comprise at least one instance of first device identification information of at least one user and/or device having authorization to access the account.

For example, at registration or any time thereafter, a user may provide their bank or online banking platform with a list of one or more phone numbers (e.g., their cellular phone number). In other embodiments, a user may provide a list of users (e.g., their first and last names or the like) authorized to access an account. As such, upon receiving a request to access the account, the first entity may provide one or more instances of device identification information in their possession indicative of users or devices having authorized access.

The authentication service, upon receiving the indication of the request to access the secured system, may initiate a process in which it determines the device identification information of the device currently attempting to access the account. In some embodiments, the authentication service may provide the first entity or the device, directly, with a URL to ping. As shown in block 510 of FIG. 5, an apparatus, for example, apparatus 200 embodied by, for example, authentication service 102, server 114, or the like, may be configured to transmit, to a second entity, a request for a network address and as shown in block 515 of FIG. 5, the apparatus, for example, apparatus 200 embodied by, for example, authentication service 102, server 114, or the like, may be configured to receive, from the second entity, the network address.

Once in possession of network address, the authentication service may then, as described above, transmit the network address to the first entity or directly to the device. As such, as shown in block 520 of FIG. 5, an apparatus, for example, apparatus 200 embodied by, for example, authentication service 102, server 114, or the like, may be configured to provide the network address to the first entity. The network address may be configured to be sent to the device from the first entity.

Subsequent to the device pinging or otherwise attempting to access the network address, the network provider may detect, determine or otherwise identify, for example, device identification information of the device currently attempting to access the account and then transmit the device identification information to the authentication service. The authentication then receives that information, in particular, for example, a subscriberID (e.g., a phone number) and/or, in some embodiments, other information, as described above, that the network provider may have associated with the device (e g, name on account, billing address, or the like). Accordingly, as shown in block 525 of FIG. 5, an apparatus, for example, apparatus 200 embodied by, for example, authentication service 102, server 114, or the like, may be configured to receive, from a second entity, second device identification information. In some embodiments, the second device identification information may be determined upon the device pinging or otherwise accessing or attempting to the network address.

As one of ordinary skill would appreciate, the format of the information may vary. For example, the first identification information may comprise, as described above, punctuation, spaces, etc. whereas the second device identification information may be in a same or different format. Therefore, in some embodiments, the authentication may "clean" or normalize the device identification information, for example, to aid in the comparison of the first identification information to the second identification information. As such, as shown in block 530 of FIG. 5, an apparatus, for example, apparatus 200 embodied by, for example, authentication service 102, server 114, or the like, may be configured to normalize the data.

Having both the first identification information and the second identification information, a comparison may be made. Accordingly, as shown in block 535 of FIG. 5, an apparatus, for example, apparatus 200 embodied by, for example, authentication service 102, server 114, or the like, may be configured to perform a real-time comparison between the first device identification information and second device identification information.

In an instance of a match between the first device identification information and second device identification information, as shown in block 540 of FIG. 5, an apparatus, for example, apparatus 200 embodied by, for example, authentication service 102, server 114, or the like, may be configured to prompt the first entity to grant the device access to the account. That is, where a match is detected, the authentication service may determine that device attempting to access the account is, in fact, authorized to access the account, and may notify the secured system.

In an instance of no match between the first device identification information and second device identification information, as shown in block 545 of FIG. 5, an apparatus, for example, apparatus 200 embodied by, for example, authentication service 102, server 114, or the like, may be configured to prompt the first entity to deny the device access to the account. That is, where a match is not detected, the authentication service may not determine that device attempting to access the account is, in fact, authorized to access the account, and may notify the secured system inasmuch.

In some embodiments, the authentication service may report a binary result (e.g., match/no match). As described above, in some embodiments, however, the authentication service may report more granular results, such as, for example, a confidence level. For example, where the phone number of a device attempting to access the account does not match a pre-authorized phone number, the authentication service may see that identification information (e.g., a name on the account) matches a name to which the phone number of the device attempting the account is registered. As such, a binary result may be that of no match, a more granular result may provide the secured system with confidence to allow access or, in some embodiments, prompt for more information. In some embodiments, the first device identification information may comprise each of a plurality of data elements such as, for example, a phone number, a name, and a location (GPS related, a billing address, or the like). The second device identification information, for example, received from the network provider after the device pings the provided network address, may provide a subset of the data elements included in the first device identification information. The authentication service may calculate a non-binary result upon making the comparison of the first device identification information and the second device identification information.

FIGS. 6A and 6B illustrate flow diagrams depicting example processes 600 and 650, respectively, for authenticating a device and a user in accordance with embodiments of the present invention. The processes illustrates how, upon reception of the authentication request, an authentication service or an API related thereto may first, perform the two-factor authentication process as shown in FIG. 5, and upon authentication of the device, authenticate the user of the device using biometric data and location data, respectively. As one of ordinary skill would appreciate from the following disclosure, an authentication service or an API related thereto may first, perform the two-factor authentication process as shown in FIG. 5, and upon authentication of the device, further perform authentication of the device using location data and/or the user of the device using biometric data. That is, a frictionless three-factor authentication process is disclosed which may include either the frictionless two-factor authentication process of FIG. 5 and either of the processes shown in FIG. 6A or 6B. And a frictionless four-factor authentication process is disclosed which may include the frictionless two-factor authentication process of FIG. 5 and the processes shown in FIG. 6A or 6B, each of which may be performed in parallel or in any order.

FIG. 6A illustrates a flow diagram depicting an example of a process 600 for authenticating a device and a user in accordance with embodiments of the present invention. The process illustrates how, upon reception of the authentication request, an authentication service or an API related thereto may first, perform the two-factor authentication process as shown in FIG. 5, and upon authentication of the device, authenticate the user of the device using biometric data. The process 600 may be performed by an apparatus, such as the apparatus 200 described above with respect to FIG. 2.

The process of FIG. 6A may include those steps of FIG. 5, for example, as shown in blocks 505-530, related to receiving. As shown in block 605 of FIG. 6A, an apparatus, for example, apparatus 200 embodied by, for example, authentication service 102, server 114, or the like, may be configured to. Subsequently, as shown in block 535 of FIG. 5, an apparatus, for example, apparatus 200 embodied by, for example, authentication service 102, server 114, or the like, may be configured to perform a real-time comparison between the first device identification information and second device identification information.

In an instance of a match between the first device identification information and second device identification information, as shown in block 605 of FIG. 6, an apparatus, for example, apparatus 200 embodied by, for example, authentication service 102, server 114, or the like, may be configured to prompt or request the first entity for biometric data.

As shown in block 610 of FIG. 6A, an apparatus, for example, apparatus 200 embodied by, for example, authentication service 102, server 114, or the like, may be configured to receive, from a first entity, with the indication of a request, received at the first entity, to access an account from a device associated with a user, first biometric data, the first biometric data captured at the device.

As shown in block 615 of FIG. 6A, an apparatus, for example, apparatus 200 embodied by, for example, authentication service 102, server 114, or the like, may be configured to receive second biometric data, the second biometric data being data associated with users having been granted authorized access to the account. For example, a user may have registered his fingerprint at account set up or any previous time of access.

As shown in block 620 of FIG. 6A, an apparatus, for example, apparatus 200 embodied by, for example, authentication service 102, server 114, or the like, may be configured to normalize the biometric data.

As shown in block 625 of FIG. 6A, an apparatus, for example, apparatus 200 embodied by, for example, authentication service 102, server 114, or the like, may be configured to perform a real-time comparison between the first biometric data and the second biometric data.

In an instance of a match between the first biometric data and second biometric data, as shown in block 630 of FIG. 6A, an apparatus, for example, apparatus 200 embodied by, for example, authentication service 102, server 114, or the like, may be configured to prompt the first entity to grant the device access to the account.

In an instance of no match between the first biometric data and second biometric data, as shown in block 635 of FIG. 6A, an apparatus, for example, apparatus 200 embodied by, for example, authentication service 102, server 114, or the like, may be configured to prompt the first entity to deny the device access to the account.

FIG. 6B illustrates a flow diagram depicting an example of a process 650 for authenticating a device and a user in accordance with embodiments of the present invention. The process illustrates how, upon reception of the authentication request, an authentication service or an API related thereto may first, perform the two-factor authentication process as shown in FIG. 5, and upon authentication of the device, authenticate the user of the device using location data. The process 600 may be performed by an apparatus, such as the apparatus 200 described above with respect to FIG. 2.

The process of FIG. 6B may include those steps of FIG. 5, for example, as shown in blocks 505-530, related to receiving the first device identification information and second device identification information. Subsequently, as shown in block 535 of FIG. 5, an apparatus, for example, apparatus 200 embodied by, for example, authentication service 102, server 114, or the like, may be configured to perform a real-time comparison between the first device identification information and second device identification information.

In an instance of a match between the first device identification information and second device identification information, as shown in block 655 of FIG. 6B, an apparatus, for example, apparatus 200 embodied by, for example, authentication service 102, server 114, or the like, may be configured to prompt or request the first entity for location data.

In some embodiments, the process of FIG. 6B may include those steps of FIG. 6A, for example, as shown in blocks 605-635, related to receiving the first biometric data and second biometric data. In those embodiments, and in an instance of a match between the first biometric data and second biometric data, as shown in block 655 of FIG. 6B, an apparatus, for example, apparatus 200 embodied by, for example, authentication service 102, server 114, or the like, may be configured to prompt or request the first entity for location data.

Regardless of whether the apparatus is using the frictionless two-factor authentication process as shown in FIG. 5 or supplementing the process of FIG. 5 as shown in FIG. 6A, the apparatus may be configured for further authenticating access using location. As shown in block 660 of FIG. 6B, an apparatus, for example, apparatus 200 embodied by, for example, authentication service 102, server 114, or the like, may be configured to receive, from a first entity, with the indication of a request, received at the first entity, to access an account from a device associated with a user, first location data. The first location data may be captured at the device and/or, in some embodiments, captured from the network provider (e.g., via triangulation, connections to a cellular base station having a known location and a radius, connection to a Wi-Fi access point, connection via Bluetooth, ZigBee or the like).

As shown in block 665 of FIG. 6B, an apparatus, for example, apparatus 200 embodied by, for example, authentication service 102, server 114, or the like, may be configured to receive second location data, the second location data being data associated with users having been granted authorized access to the account. For example, a user may have registered his address (e.g., home address, work address, or the like) at account set up or any previous time of access.

As shown in block 670 of FIG. 6B, an apparatus, for example, apparatus 200 embodied by, for example, authentication service 102, server 114, or the like, may be configured to normalize the location data.

As shown in block 675 of FIG. 6B, an apparatus, for example, apparatus 200 embodied by, for example, authentication service 102, server 114, or the like, may be configured to perform a real-time comparison between the first location data and the second location data.

In an instance of a match between the first location data and second location data, as shown in block 680 of FIG. 6B, an apparatus, for example, apparatus 200 embodied by, for example, authentication service 102, server 114, or the like, may be configured to prompt the first entity to grant the device access to the account.

In an instance of no match between the first location data and second location data, as shown in block 685 of FIG. 6B, an apparatus, for example, apparatus 200 embodied by, for example, authentication service 102, server 114, or the like, may be configured to prompt the first entity to deny the device access to the account.

Use Cases

In an example embodiment of the present invention, an apparatus or computer program product may be provided to implement or execute a method, process, or algorithm for facilitating frictionless two-factor authentication in the attempted access to an IoT device such as, for example, (i) a security system (e.g., a physical lock outfitted with an embodiment of the present invention) protecting or otherwise controlling access to a home, apartment, a hotel room, an automobile, storage unit, safe, lock (e.g., bike lock, case lock, briefcase lock, luggage lock, or the like), etc., (ii) an automation system (e.g., a system configured for controlling an automobile, one or more various switches in a power or dam system), or (iii) a ticketing system.

Here, the user, for example, operating a user device with a mobile app installed thereon with a particular purpose (e.g., accessing security system such as the lock on their car) opens the app, which may or may not require login credentials. Once logged in, the user may then send a command to the security or automation system. The command serves as the request to access. As such, as described with regard to FIG. 5, the authentication service receives the indication of the request.

Two different embodiments exist. First, where the user device and the security system have access to, for example, a wireless network (e.g., a cellular network, a Wi-Fi network, a private network, or the like) the process may continue as above. In particular, the user device sends the command to, for example, the secured system (e.g., an IoT device configured for unlocking your), the authentication service receives the indication of the request, the user device pings a network address, and the authentication service is provided with device identification information indicating the user device currently attempting to access the security system. In the case of a match, the lock opens by, in one instance where the security system is remote, the security system sending a signal to the lock instructing it to open, or in an instance in which the security system is local, instructing the lock to open. Moreover, as described above, the authentication service may be configured to further authenticate by confirming the ownership of the device via biometric data and/or proximity via location data.

In another embodiment, a user device, which may typically have access to a cellular network or wireless cable network, does not, temporarily or permanently, have access to the cellular network or the wireless cable network. In such case, a local proximity network may be used using, for example, local proximity network signals. For example, upon establishing, for example, a Bluetooth connection with the user device, the security system may receive the command (e.g., a request to access), which when using local proximity network signals (e.g., Bluetooth, Near-field radio signals, RF signals, etc.) does provide device identification information (i.e. a Bluetooth connection is only established by the requesting device identifying itself) and initiate an authentication session with the authentication service, for example, locally. The security system, in providing the indication of the request, provides both the device identification information provided by the device attempting access provided in establishing the Bluetooth connection and locally stored device identification information. The authentication service then compares the first device identification information and second device identification information as described above, and prompts the security system as described above. As such, even with no "outside" connection, the frictionless two-factor authentication system described herein may operate.

In the instance of a ticketing system, upon sale or re-sale of a ticket, embodiments of the present invention may be used to confirm authenticity of the ticket and owner combination. For example, a ticketing system may enable resale of a ticket (e.g., a season ticket hold is unable to make a game and sells the ticket). Before the sale is confirmed, a user having offered the ticket for sale, received, and accepted an offer, may send a command to the ticketing system, for example, configured to enable their collection of the payment and transfer of the ticket. The ticketing system may open an authentication session with the authentication service and provide the authentications service with the user device information of the user device known to having last purchased the ticket (e.g., the first device identification information). The user device pings to network address, and the network provider provides, to the authentication service, the device identification information of the device currently attempting to access the ticketing system (e.g., the second device identification information). Upon a match, the authentication service may prompt the ticketing system to complete the transaction—whereas, in an instance in which there is no match (the device identification information of the device attempting to sell a ticket does not match the device identification information of the device having last purchased the ticket), the authentication service prompts the ticketing system to deny the transaction.

Moreover, when attempting to access an event, a user device may present a ticket to a ticket collection device/kiosk connected to the ticketing system, the presentment of the ticket being the request to access. The ticketing system (or the ticket collection device/kiosk) may initiate an authentication session with the authentication service. Again, the authentication service is provided with the indication of the request the device identification information of the user device having last purchased the ticket (e.g., the first device identification information). The ticketing system may then prompt the user device to ping a network address, the user device pings to network address, and the network provider provides, to the authentication service, the device identification information of the device currently attempting to access the ticketing system (e.g., the second device identification information). After comparison, upon a match, the authentication service may prompt the ticketing system to allow entry—whereas, in an instance in which there is no match (the device identification information of the device attempting to utilize the ticket for entrance does not match the device identification information of the device having last purchased the ticket), the authentication service prompts the ticketing system to deny entry.

In another use case, for instance, in the initial establishment of an account, where a user only provides registration information, and, for example, the secured system does not provide first device identification information (e.g., there is no previously authorized device), the authentication service may be configured to determine, detect, identify, or otherwise access one or more databases with information able to correlate that information the secured system does provide (e.g., the registration information, such as name and address) with the second device identification information.

In particular, a user operating a user device initiates a process to open an account. Some amount of registration information is necessary. The secured system may then initiate an authentication session with the authentication service and, provide the registration information, with the indication of the request. The user device pings the network address and the authentication service receives the second device identification information.

Operation

FIGS. 3, 4A, 4B, 5, 6A, and 6B show data flows or flowcharts (hereinafter, flowcharts) of the exemplary operations performed by a method, apparatus and computer program product in accordance with embodiments of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 206 of an apparatus employing an embodiment of the present invention and executed by a processor 204 in the apparatus. As will be appreciated, any such computer program instructions may be loaded onto a computer or other programmable apparatus (for example, hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3, 4A, 4B, 5, 6A, and 6B when executed, convert a computer or processing circuitry into a particular machine configured to perform an example embodiment of the present invention. Accordingly, the operations of FIGS. 3, 4A, 4B, 5, 6A, and 6B define an algorithm for configuring a computer or processing to perform an example embodiment. In some cases, a general purpose computer may be provided with an instance of the processor which performs the algorithms of FIGS. 3, 4A, 4B, 5, 6A, and 6B to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be unnecessary, modified or further amplified. It should be appreciated that each of the modifications, optional operations or amplifications may be included with the operations either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for performing frictionless two-factor authentication, the method comprising:
    receiving, from a first entity, an indication of a request received at the first entity to access an account from a device associated with a user, the indication comprising at least one instance of first device identification information of at least one device having authorization to access the account;
    providing a network address to the first entity, the network address configured to be sent to the device from the first entity;
    receiving, from a second entity, second device identification information, the second device identification information determined upon the device accessing to the network address;
    normalizing the first device identification information and the second device identification information;
    performing a real-time comparison between the first device identification information and second device identification information, wherein the real-time comparison between the first device identification information and second device identification information comprises determining whether (i) the normalized first device identification information and (ii) the normalized second device identification information match; and
    prompting the first entity to grant the device access to the account if a match is detected between the normalized first device identification information and the normalized second device identification information.

2. The method according to claim 1, wherein the network address is a uniform resource locator (URL) address.

3. The method according to claim 1, wherein the first entity is a bank server.

4. The method according to claim 1, wherein the second entity is a cellular network provider or a cable network provider.

5. The method according to claim 1, further comprising: determining a confidence level of (i) the first device identification information and (ii) the second device identification information match.

6. The method according to claim 1, wherein the first device identification information and the second device identification information is at least one of a telephone number, a device serial number, a unique serial number (ICCID), an international mobile subscriber identity (IMSI) number, or an International Mobile Equipment Identity (IMEI).

7. The method according to claim 1, further comprising: receiving a first set of biometric data from the first entity, the first set of biometric data used at log in at the first entity; receiving a second set of biometric data from the second entity, the second set of biometric data used when accessing the network address; and performing a comparison between the first set of biometric data and the second set of biometric data.

8. An apparatus for performing frictionless two-factor authentication, the apparatus comprising at least one processor and at least one memory including computer program code, the at least one memory and the computer program code configured to, with the processor, cause the apparatus to at least:
    receive, from a first entity, an indication of a request received at the first entity to access an account from a device associated with a user, the indication comprising at least one instance of first device identification information of at least one device having authorization to access the account;
    provide a network address to the first entity, the network address configured to be sent to the device from the first entity;
    receive, from a second entity, second device identification information, the second device identification information determined upon the device accessing to the network address;
    normalize the first device identification information and the second device identification information;
    perform a real-time comparison between the first device identification information and second device identification information, wherein the real-time comparison between the first device identification information and second device identification information comprises determining whether (i) the normalized first device identification information and (ii) the normalized second device identification information match; and
    prompt the first entity to grant the device access to the account if a match is detected between the normalized first device identification information and the normalized second device identification information.

9. The apparatus according to claim 8, wherein the network address is a uniform resource locator (URL) address.

10. The apparatus according to claim 8, wherein the first entity is a bank server.

11. The apparatus according to claim 8, wherein the second entity is a cellular network provider or a cable network provider.

12. The apparatus according to claim 8, wherein the at least one memory and the computer program code are further configured to, with the processor, cause the apparatus to: determine a confidence level of (i) the first device identification information and (ii) the second device identification information match.

13. The apparatus according to claim 8, wherein the first device identification information and the second device identification information is at least one of a telephone number, a device serial number, a unique serial number (ICCID), an international mobile subscriber identity (IMSI) number, or an International Mobile Equipment Identity (IMEI).

14. The apparatus according to claim 8, wherein the at least one memory and the computer program code are further configured to, with the processor, cause the apparatus to: receive a first set of biometric data from the first entity, the first set of biometric data used at log in at the first entity; receive a second set of biometric data from the second entity, the second set of biometric data used when accessing the network address; and performing a comparison between the first set of biometric data and the second set of biometric data.

15. A computer program product for performing frictionless two-factor authentication, the computer program product comprising at least one non-transitory computer-readable storage medium having computer-executable program code instructions stored therein, the computer-executable program code instructions comprising program code instructions for:
receiving, from a first entity, an indication of a request received at the first entity to access an account from a device associated with a user, the indication comprising at least one instance of first device identification information of at least one device having authorization to access the account;
providing a network address to the first entity, the network address configured to be sent to the device from the first entity;
receiving, from a second entity, second device identification information, the second device identification information determined upon the device accessing to the network address;
normalizing the first device identification information and the second device identification information;
performing a real-time comparison between the first device identification information and second device identification information, wherein the real-time comparison between the first device identification information and second device identification information comprises determining whether (i) the normalized first device identification information and (ii) the normalized second device identification information match; and
prompting the first entity to grant the device access to the account if a match is detected between the normalized first device identification information and the normalized second device identification information.

16. The computer program product according to claim 15, wherein the network address is a uniform resource locator (URL) address.

17. The computer program product according to claim 15, wherein the first entity is a bank server.

18. The computer program product according to claim 15, wherein the second entity is a cellular network provider or a cable network provider.

19. The computer program product according to claim 15, wherein the computer-executable program code instructions further comprise program code instructions for: determining a confidence level of (i) the first device identification information and (ii) the second device identification information match.

20. The computer program product according to claim 15, wherein the first device identification information and the second device identification information is at least one of a telephone number, a device serial number, a unique serial number (ICCID), an international mobile subscriber identity (IMSI) number, or an International Mobile Equipment Identity (IMEI).

21. The computer program product according to claim 15, wherein the computer-executable program code instructions further comprise program code instructions for: receiving a first set of biometric data from the first entity, the first set of biometric data used at log in at the first entity; receiving a second set of biometric data from the second entity, the second set of biometric data used when accessing the network address; and performing a comparison between the first set of biometric data and the second set of biometric data.

22. A method for performing frictionless two-factor authentication, the method comprising:
receiving, from a first entity, an indication of a request received at the first entity to access an account from a device associated with a user, the indication comprising at least one instance of first device identification information of at least one device having authorization to access the account;
providing a network address to the first entity, the network address configured to be sent to the device from the first entity;
receiving, from a second entity, second device identification information, the second device identification information determined upon the device accessing to the network address;
receiving a first set of biometric data from the first entity, the first set of biometric data used at log in at the first entity; receiving a second set of biometric data from the second entity, the second set of biometric data used when accessing the network address;
performing a real-time comparison between the first device identification information and second device identification information;
performing a comparison between the first set of biometric data and the second set of biometric data; and
prompting the first entity to grant the device access to the account if a match is detected between both (i) the first device identification information and the second device identification information and (ii) the first set of biometric data and the second set of biometric data.

23. An apparatus for performing frictionless two-factor authentication, the apparatus comprising at least one processor and at least one memory including computer program code, the at least one memory and the computer program code configured to, with the processor, cause the apparatus to at least:

receive, from a first entity, an indication of a request received at the first entity to access an account from a device associated with a user, the indication comprising at least one instance of first device identification information of at least one device having authorization to access the account;

provide a network address to the first entity, the network address configured to be sent to the device from the first entity;

receive, from a second entity, second device identification information, the second device identification information determined upon the device accessing to the network address;

receive a first set of biometric data from the first entity, the first set of biometric data used at log in at the first entity;

receive a second set of biometric data from the second entity, the second set of biometric data used when accessing the network address;

perform a real-time comparison between the first device identification information and second device identification information;

perform a comparison between the first set of biometric data and the second set of biometric data; and prompt the first entity to grant the device access to the account if a match is detected between both (i) the first device identification information and the second device identification information and (ii) the first set of biometric data and the second set of biometric data.

24. A computer program product for performing frictionless two-factor authentication, the computer program product comprising at least one non-transitory computer-readable storage medium having computer-executable program code instructions stored therein, the computer-executable program code instructions comprising program code instructions for:

receiving, from a first entity, an indication of a request received at the first entity to access an account from a device associated with a user, the indication comprising at least one instance of first device identification information of at least one device having authorization to access the account;

providing a network address to the first entity, the network address configured to be sent to the device from the first entity;

receiving, from a second entity, second device identification information, the second device identification information determined upon the device accessing to the network address;

receiving a first set of biometric data from the first entity, the first set of biometric data used at log in at the first entity; receiving a second set of biometric data from the second entity, the second set of biometric data used when accessing the network address;

performing a real-time comparison between the first device identification information and second device identification information;

performing a comparison between the first set of biometric data and the second set of biometric data; and prompting the first entity to grant the device access to the account if a match is detected between both (i) the first device identification information and the second device identification information and (ii) the first set of biometric data and the second set of biometric data.

\* \* \* \* \*